(12) United States Patent
Freitag et al.

(10) Patent No.: US 7,572,363 B2
(45) Date of Patent: Aug. 11, 2009

(54) STEAM GENERATION IN STEAM REFORMING PROCESSES

(75) Inventors: Christian Freitag, München (DE); Dino Henes, München (DE); Stefano Innocenzi, München (DE); Bernd Kandziora, Baierbrunn (DE); Harald Klein, Wolfratshausen (DE); Josef Schwarzhuber, Wolnzach (DE)

(73) Assignee: Linde AG, Wiesbaden (DE)

( * ) Notice: Subject to any disclaimer, the term of this patent is extended or adjusted under 35 U.S.C. 154(b) by 282 days.

(21) Appl. No.: 11/740,498

(22) Filed: Apr. 26, 2007

(65) Prior Publication Data

US 2007/0284287 A1    Dec. 13, 2007

(51) Int. Cl.
  *C01G 35/00*    (2006.01)
  *B01J 7/00*    (2006.01)
  *C01B 3/36*    (2006.01)
  *C01B 3/00*    (2006.01)
  *C01B 3/24*    (2006.01)

(52) U.S. Cl. .................. 208/133; 48/61; 48/197 R; 48/198.1

(58) Field of Classification Search ............... 208/133; 48/61, 197 R, 198.1
See application file for complete search history.

(56) References Cited

U.S. PATENT DOCUMENTS

| | | | | |
|---|---|---|---|---|
| 3,882,636 A | * | 5/1975 | Horie et al. ............... | 48/214 A |
| 3,929,431 A | * | 12/1975 | Koh et al. ................. | 48/214 R |
| 6,761,838 B2 | * | 7/2004 | Zeng et al. ................ | 252/373 |
| 6,936,082 B2 | * | 8/2005 | Primdahl .................. | 48/197 R |
| 7,160,344 B2 | * | 1/2007 | Choudhary et al. ........ | 48/198.7 |
| 7,429,373 B2 | * | 9/2008 | Pez et al. .................... | 423/652 |
| 2002/0010220 A1 | * | 1/2002 | Zeng et al. ................. | 518/703 |
| 2003/0150163 A1 | * | 8/2003 | Murata et al. ............. | 48/197 R |
| 2004/0118047 A1 | * | 6/2004 | Choudhary et al. ........ | 48/198.7 |
| 2006/0292069 A1 | * | 12/2006 | Pez et al. .................... | 423/651 |
| 2007/0011945 A1 | * | 1/2007 | Grootveld et al. ......... | 48/197 R |
| 2007/0172418 A1 | * | 7/2007 | Slager et al. ................ | 423/651 |
| 2007/0264186 A1 | * | 11/2007 | Dybkjaer et al. ......... | 423/418.2 |

* cited by examiner

*Primary Examiner*—Walter D Griffin
*Assistant Examiner*—Huy-Tram Nguyen
(74) *Attorney, Agent, or Firm*—Millen, White, Zelano, Branigan, P.C.

(57) ABSTRACT

A process and apparatus are provided for generating at least two types of steam having different purities in steam reforming processes in which at least two steam reforming units (steam reformers) (are operated in parallel. The first steam stream having a higher purity than that of the second steam stream. The steam reformers operated in parallel are combined to form groups of at least two steam reformers (groups) within which the high purity steam is generated in one of the steam reformers by vaporization of degassed and demineralized water and low purity steam is generated in at least one of the other steam reformers by vaporization of degassed impurity-containing water (dirty water). The dirty water is formed at least in part from the condensate (process condensate) produced within a group, and is predominantly made up of water.

14 Claims, 2 Drawing Sheets

STEAM GENERATION IN STEAM REFORMING PROCESSES

The invention relates to a process for generating at least two types of steam having different purities in steam reforming processes in which at least two steam reforming units (steam reformers) are operated in parallel, the first steam type (pure steam) having a higher purity than the second steam type (dirty steam), and also to a device for carrying out the process.

In steam reforming processes, hydrocarbon-containing feeds, such as natural gas, light petroleum or naphtha, are mixed with steam and reacted in steam reformers to form synthesis gas, a gas mixture containing carbon monoxide (CO) and hydrogen ($H_2$). From the synthesis gas, by purification and fractionation in further process steps, substances such as CO, $H_2$ or oxogas (a defined mixture of $H_2$ and CO) are produced and given off as products. In order to react the hydrocarbons used with a high degree of conversion, the steam reforming is customarily carried out in such processes with a high steam excess. In order to remove the excess water, the synthesis gas produced in this manner is cooled to below the dew point of water vapour, as a result of which the water vapour condenses out and what is called process condensate forms which is predominantly made up of water and is generally loaded with impurities such as methanol, ammonia, carbon dioxide, formic acid and acetic acid.

According to the prior art, the process condensate is mixed with demineralized water which is customarily supplied to the process from the outside. The mixed water thus formed is subsequently degassed and vaporized against material streams which are to be cooled or are coolable in steam reforming processes. After superheating the steam against coolable exhaust gases, a part of the steam (process steam) is used internally in the process, while the remainder (export steam) is not utilized within the steam reforming process, but in an external process. Generation of export steam makes it possible to use heat which is not utilizable in the steam reforming process and to increase the economic efficiency of the steam reforming process.

Frequently, consumers' requirements of the quality of export steam are so high that they cannot be met by an export steam generated in the manner described above. For instance, the electrical conductivity of export steam which is intended to be utilized in a condensation turbine must not be greater than 0.2 µS/cm, a value which is frequently exceeded, however, owing to the impurities present in the process condensate. In such cases, in order not to have to omit the production of export steam, processes exist which provide cleaning of process condensate before it is mixed with demineralized water.

Processes are known for purifying the process condensate in which the unwanted substances are separated off by stripping in stripping columns. The stripping gases used in this case are air or hydrocarbon-containing material streams (for example natural gas).

In other processes, the process condensate is expanded and subsequently degassed in a scrubbing column by means of low-pressure steam, air or nitrogen. The impurities are removed into the open air in this case together with the purification medium. In order to be able to meet even high purity requirements of the steam generated, these processes provide a further purification step by ion exchange in corresponding reactors.

In order to generate export steam of high purity by the prior art in a steam reforming process, a considerable expenditure in terms of apparatus (stripper columns, ion exchangers) and thus also financial expenditure are necessary. Furthermore, in some circumstances the amount of export steam decreases, since the energy required for purification can no longer be recovered.

If in a steam reforming process a plurality of steam reformers are operated in parallel, these steam reformers of the prior art are frequently all equipped with steam generation units in which not only process steam but also export steam are generated, as a result of which the economic efficiency of the steam reforming carried out in such a unit is considerably impaired. This is particularly true when export steam of high purity is to be generated, since then the above-described high technical expenditure and running costs must be borne for each of the steam reformers.

SUMMARY OF THE INVENTION

According to an aspect of the present invention, there is provided a process of the type mentioned above which permits generation of steam with high purity, but without the disadvantages of the prior art, and also an apparatus for carrying out the process.

Upon further study of the specification and appended claims, further objects, aspects and advantages of this invention will become apparent to those skilled in the art.

According to an embodiment of the invention, steam reformers operated in parallel are combined to form groups of at least two steam reformers (groups), within which high purity steam, preferably the entire amount of high purity steam, is generated in one of the steam reformers by vaporization of degassed and demineralized water (pure water), preferably by exclusive vaporization of degassed and demineralized water.

Additionally, dirty steam or low purity steam, preferably the entire amount of dirty steam, is generated in the other steam reformer or other steam reformers by vaporization of degassed impurity-containing water (dirty water), the dirty water being formed at least in part from the condensate (process condensate) produced within a group. The process condensate is predominantly made up of water.

According to another embodiment of the invention, there is provided a process for generating at least two of steam streams having different purities during steam reforming, the process comprising:

operating at least two steam reforming units in parallel, wherein the at least two steam reformers are combined to form groups of at least two steam reformers;

generating a high purity steam stream in one of the steam reformers of each of the groups by vaporization of degassed and demineralized water; and generating a low purity steam stream in at least one of the other steam reformers of each of the groups by vaporization of degassed impurity-containing water;

wherein the low purity steam stream is formed at least in part from condensate produced from steam used in the group of steam reformers.

The fraction of the high purity water intended for generation of high purity steam and also of high purity steam itself are not mixed with other material streams in the steam reforming process that would adversely impact the purity thereof, in particular not with dirty water (low purity water) or dirty steam. The purity of the high purity steam is therefore, preferably, determined solely by the purity of the high purity water. Expediently, the high purity water is produced from drinking water or from water having only low amounts of impurities, in water treatment processes as are adequately known from the prior art.

To achieve high economic efficiency of the steam reforming process, attempts are made to preferably use most if not all of the high purity steam generated in a group as "export steam," that is it is fed to a use outside the steam reforming process. As a function of the operating conditions within a group, it can, however, be necessary to use a part of the high purity steam within the group. An embodiment of the method of the invention therefore provides that the high purity steam generated within a group is subdivided into at least a first high purity steam stream and a second high purity steam stream, the first high purity steam stream (export steam) being fed to a use outside the steam reforming process, while the second high purity steam stream (make-up steam) is utilized completely within the group.

According to a further embodiment of the process according to the invention, the make-up steam is used as process steam in the steam reforming process is expediently mixed with dirty or low purity steam and fed as process steam to at least one of the steam reformers of the group. Preferably, the make-up steam is fed as process steam exclusively to the steam reformer used for generating pure steam within the group.

According to another embodiment of the process of the invention, the dirty water or low purity water is preferably made up of the process condensate produced within a group or is generated by mixing the process condensate produced within a group with high purity water. Preferably, process condensate and high purity water are mixed, the resultant liquid mixture is vaporized by heating, and the steam stream thus generated, if appropriate after superheating, is passed on as the dirty or low purity steam. Another preferred embodiment of the process according to the invention provides that process condensate and high purity water are converted to the steam phase separately. The resultant steam streams are subsequently combined and, if appropriate after superheating, passed on as dirty or low purity steam.

The requirements of the purity of the export steam are not always so high that it would have to be produced exclusively from high purity steam. Frequently the purity as exhibited by the dirty or low purity steam generated within a group is also sufficient. An expedient variant of the process according to the invention therefore provides that at least a part of the dirty or low purity steam generated in a group is exported and fed to a use outside the steam reforming process.

The requirements of the pressure of the export steam are frequently not identical to the requirements of the pressure of the process steam. Therefore, another variant of the process according to the invention provides that the dirty or low purity steam, from which process steam is generated, and the high purity steam from which export steam is generated are generated within a group at identical or different pressures.

Superheating steam (high purity steam or low purity steam) generated from a water-containing material stream (high purity water or high purity water) and/or vaporizing a water-containing material stream proceeds, according to another embodiment of the invention, by indirect heat exchange with material streams to be cooled and/or coolable in the steam reforming process. "Material streams to be cooled" are taken to mean in this case those material streams which must be cooled in the steam reforming process in order to obtain the desired products. One example of such a material stream is a synthesis gas stream which exits hot from a steam reformer and must be introduced cold into a fractionation unit. "Coolable material streams" are taken to mean material streams which can be cooled, for example for reasons of improved energy utilization, but not cooling them has no effect on the amount and quality of the products to be produced. One example of such a material stream is the exhaust gas which exits hot from a steam reformer.

The invention further relates to an apparatus for generating at least two types of steam having different purities in at least two steam reforming units (steam reformers) operated in parallel, the first steam type (pure steam) having a higher purity than the second steam type (dirty steam).

According to an embodiment of the apparatus of the invention, steam reformers operated in parallel are combined to form groups of at least two steam reformers (groups), within which, in each case, one steam reformer is fed with degassed and demineralized water (high purity water), preferably solely degassed and demineralized water, for generating the entire amount of high purity steam, preferably the entire amount of high purity steam, and the other steam reformer or other steam reformers are fed with degassed impurity-containing water (dirty or low purity water) to generate the entire amount of dirty or low purity steam, preferably the entire amount of low purity steam, the dirty or low purity water being formed at least in part from the condensate (process condensate) being produced within a group. The process condensate is predominantly made up of water.

According to another embodiment of the apparatus of the invention, the apparatus comprises at least two steam reforming units operated in parallel, wherein the steam reformers operated in parallel are combined to form groups of at least two steam reformers (groups), a first feeding means associated with each steam reformer group for feeding one steam reformer of the steam reformer group with degassed and demineralized water, wherein the degassed and demineralized water is converted into a high purity steam, and means associated with each steam reformer group for removing high purity steam from the one steam reformer, a second feeding means associated with each steam reformer group for feeding degassed impurity-containing water to at least one of the other steam reformers of the steam reformer group, wherein the degassed impurity-containing water is converted into low purity steam, and means associated with each steam reformer group for removing low purity steam from the at least one of the other steam reformers, and a condensate forming means associated with each steam reformer group for forming water condensate from synthesis gas formed in one or more of the steam reformers of the group, wherein the condensate forming means is in fluid communication with the second feeding means of the group, whereby the degassed impurity-containing water fed by the second feeding means is formed at least in part from the water condensate produced within the steam reformer group.

A preferred embodiment of the apparatus according to the invention provides that each of the steam reformers of a group is equipped with exactly one unit for steam generation.

Expediently, a unit for steam generation comprises heat exchangers via which heat can be removed in indirect heat exchange from material streams to be cooled and/or are coolable and is transferable to steam (pure steam or dirty steam) generated from a water-containing material stream (pure water or dirty water) and/or to a water-containing material stream.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

Figure 1:
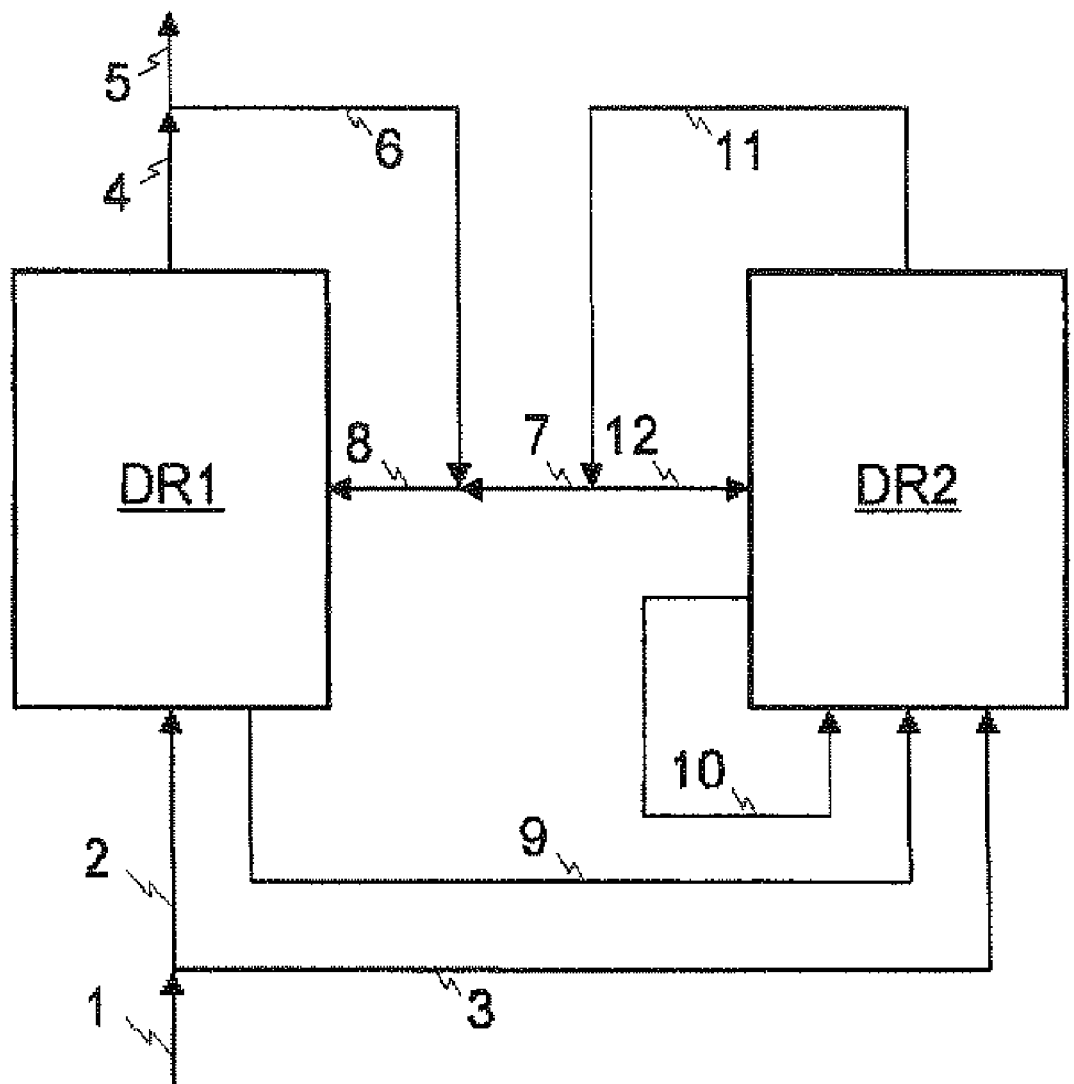
FIG. 1 diagrammatically illustrates an embodiment of the invention.
Figure 2:
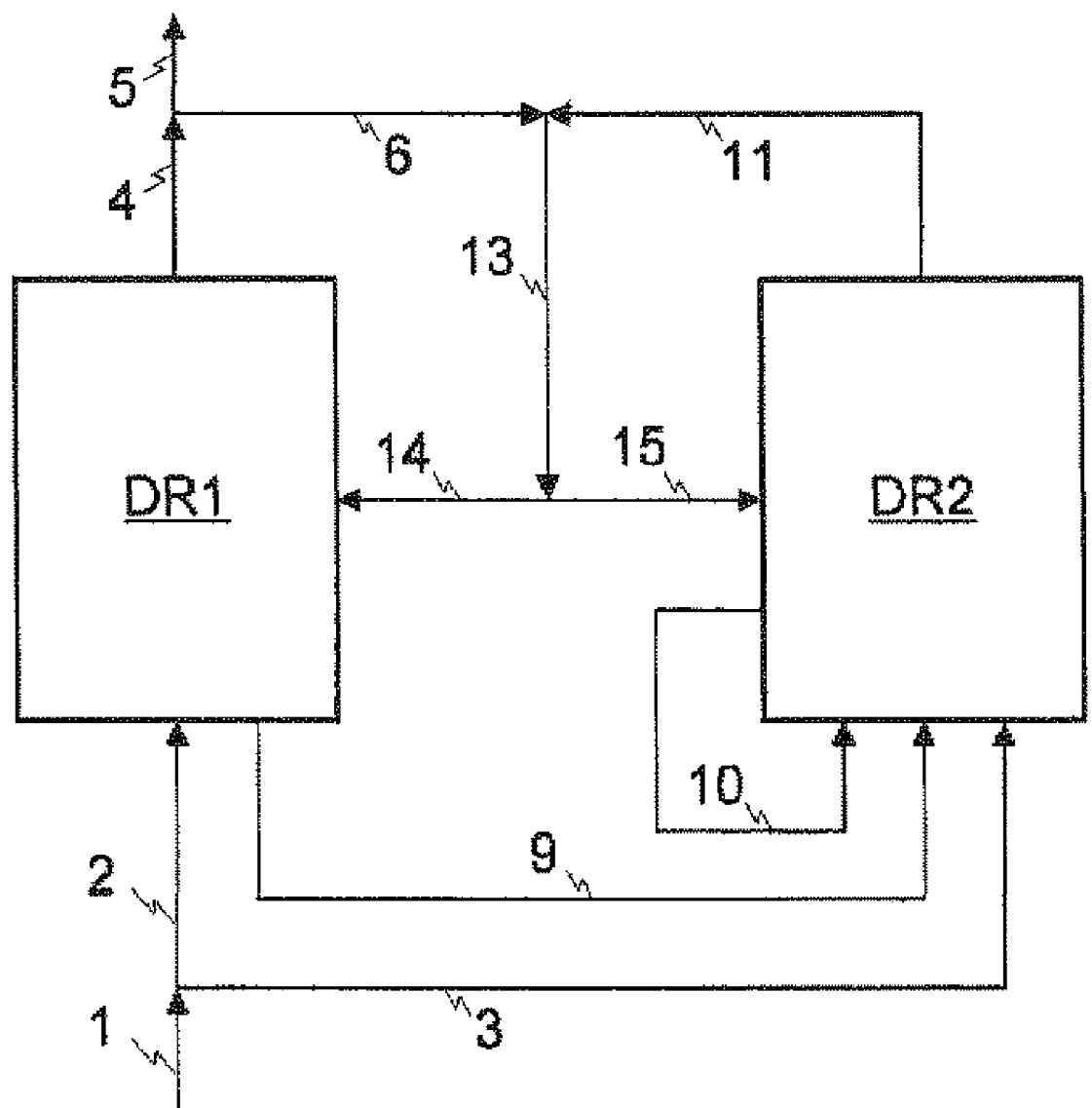
FIG. 2 diagrammatically illustrates another embodiment of the invention.

The embodiments shown in FIGS. 1 and 2 differ only in the type of generation of process steam in the two steam reformers for the steam reforming processes.

DETAILED DESCRIPTION OF THE DRAWINGS

In the example shown in FIG. 1, degassed and demineralized water (pure water) is passed to the steam reforming process via line 1. A part of the pure water stream flows to the steam reformer DR1 via line 2, while another part is fed to the steam reformer DR2 via line 3. The pure water stream 2 is introduced as sole feedstock into the steam generation unit of the steam reformer DR1 (which is not shown), converted to pure steam there and fed via line 4 out of the steam reformer DR1. The predominant amount of pure steam 4 which meets the purity requirements of a condensation turbine process is passed out of the steam reforming process as export steam via line 5 and fed to an external use. The remaining residue of the pure steam is passed on via line 6, mixed with dirty steam conducted out of the steam reformer DR2 via line 7 and recirculated to the steam reformer DR1 as process steam via line 8. Process condensate produced in the steam reformer DR1 is fed to the steam reformer DR2 via line 9, applied as feed together with the process condensate 10 arising there and the pure water conducted via line 3 to the steam generation unit of the steam reformer DR2 (which is not shown) and converted to dirty steam. The dirty steam is passed out of the steam reformer DR2 via line 11 and subdivided into two substreams 7 and 12, of which the one 7 is conducted to the steam reformer DR1, while the second is introduced into the steam reformer DR2 via line 12 as process steam.

In the example shown in FIG. 2, a part of the pure steam 4 which is generated in the steam reformer DR1 is branched off via line 6 and mixed in line 13 with all the dirty steam passed out of the steam reformer DR2 via line 11. The mixture thus generated is subsequently subdivided and passed as process steam via lines 14 and 15 to the steam reformers DR1 and DR2.

The entire disclosures of all applications, patents and publications, cited herein and of corresponding German application No. DE 102006019699.6, filed Apr. 27, 2006, are incorporated by reference herein.

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for generating at least two steam streams having different purities during steam reforming in which at least two steam reforming units are operated in parallel, the first steam stream having a high purity and the second steam stream having a low purity, said process comprising:
    operating a plurality of steam reformers in parallel wherein the steam reformers are combined to form groups of at least two steam reformers, within which the entire amount of high purity steam generated in each group is generated in one of the steam reformers by exclusive vaporization of degassed and demineralized water and the entire amount of low purity steam generated in each group is generated in the other steam reformers of each group by vaporization of degassed impurity-containing water;
    wherein the degassed impurity-containing water is formed at least in part from the condensate produced within said group, and said degassed impurity-containing water being predominantly water.

2. A process for generating at least two of steam streams having different purities during steam reforming, said process comprising:
    operating at least two steam reforming units in parallel, wherein said at least two steam reformers are combined to form groups of at least two steam reformers;
    generating a high purity steam stream in one of the steam reformers of each of said groups by vaporization of degassed and demineralized water; and
    generating a low purity steam stream in at least on of the other steam reformers of each of said groups by vaporization of degassed impurity-containing water;
    wherein the low purity steam stream is formed at least in part from condensate produced from steam used in the group of steam reformers.

3. A process according to claim 1, wherein the high purity steam generated within each group is subdivided into a first high purity steam stream and a second high purity steam stream, the first high purity steam stream being fed to a use outside the steam reforming process, and the second high purity steam stream being utilized within the group.

4. A process according to claim 3, wherein the second high purity steam stream is used as process steam in the steam reforming process.

5. A process according to claim 4, wherein the second high purity steam stream is mixed with low purity steam and fed as process steam to at least one of the steam reformers of the group.

6. A process according to claim 5, wherein the second high purity steam stream is fed as process steam exclusively to the steam reformer used for generating the high purity steam stream.

7. A process according to claim 1, wherein within each group the degassed impurity-containing water is produced by mixing all of the process condensate produced with pure water.

8. A process according to claim 1, wherein at least a part of the low purity steam generated in a group is fed to a use outside the steam reforming process.

9. A process according to claim 1, wherein the low purity steam and the high purity steam are generated within a group at the same pressure.

10. A process according to claim 1, wherein the low purity steam and the high purity steam are generated within a group at the different pressure.

11. An apparatus for generating at least two steam streams having different purities in at least two steam reforming units operated in parallel, the first steam having a higher purity than the second steam, said apparatus comprising:

a plurality of steam reformers operated in parallel combined to form groups of at least two steam reformers (groups), within each group, means for feeding degassed and demineralized water to one of the steam reformers for generating high purity steam within said one of the steam reformers, within each group, means for feeding degassed impurity-containing water to the remaining steam reformer for generating low purity steam, and within each group means for forming condensate, whereby at least part of said degassed impurity-containing water is formed from said condensate.

12. An apparatus for generating at least two steam streams having different purities, said apparatus comprising:

at least two steam reforming units operated in parallel, wherein the steam reformers operated in parallel are combined to form groups of at least two steam reformers (groups), a first feeding means associated with each steam reformer group for feeding one steam reformer of the steam reformer group with degassed and demineralized water, wherein said degassed and demineralized water is convened into a high purity steam, and means associated with each steam reformer group for removing high purity steam from said one steam reformer, a second feeding means associated with each steam reformer group for feeding degassed impurity-containing water to at least one of the other steam reformers of the steam reformer group, wherein said degassed impurity-containing water is converted into low purity steam, and means associated with each steam reformer group for removing low purity steam from said at least one of the other steam reformers, and a condensate forming means associated with each steam reformer group for forming water condensate from synthesis gas formed in one or more of the steam reformers of the group, wherein said condensate forming means is in fluid communication with said second feeding means of the group, whereby the degassed impurity-containing water fed by said second feeding means is formed at least in part from the water condensate produced within the steam reformer group.

13. An apparatus according to claim 11, wherein each steam reformer of each group is equipped with exactly one unit for steam generation.

14. An apparatus according to claims 13, wherein the units for steam generation comprise heat exchangers wherein heat is removed, by indirect heat exchange, from material streams to be cooled and/or are coolable and is transferred to a water-containing material stream and/or to steam generated from a water-containing material stream.

* * * * *

UNITED STATES PATENT AND TRADEMARK OFFICE
CERTIFICATE OF CORRECTION

| | | |
|---|---|---|
| PATENT NO. | : 7,572,363 B2 | Page 1 of 1 |
| APPLICATION NO. | : 11/740498 | |
| DATED | : August 11, 2009 | |
| INVENTOR(S) | : Freitag et al. | |

It is certified that error appears in the above-identified patent and that said Letters Patent is hereby corrected as shown below:

Title Page;
After Section (65), insert Section --(30) Foreign Application Priority Data,
April 27, 2006  (DE)    10 2006 019 699.6--

Signed and Sealed this

Seventeenth Day of November, 2009

David J. Kappos
*Director of the United States Patent and Trademark Office*